United States Patent [19]
Kim

[11] Patent Number: 4,752,843
[45] Date of Patent: Jun. 21, 1988

[54] SYSTEM FOR INDICATING A PRECISE TRACKING IN A VIDEO CASSETTE RECORDER

[75] Inventor: Jong H. Kim, Taegu, Rep. of Korea
[73] Assignee: Gold Star Co., Ltd., Seoul, Rep. of Korea
[21] Appl. No.: 921,059
[22] Filed: Oct. 21, 1986
[30] Foreign Application Priority Data Oct. 21, 1985 [KR] Rep. of Korea .......................... 13743

[51] Int. Cl.⁴ ........................ G11B 20/00; G11B 27/36
[52] U.S. Cl. ...................................... 360/75; 360/33.1; 360/77; 360/84; 360/137; 369/53; 369/55
[58] Field of Search .................... 360/31, 77, 137, 107, 360/109, 84, 85, 33.1; 358/338; 369/53, 55

[56] References Cited
PUBLICATIONS

Harry Kybet, Video Tape Recorders, Howard W. Sams & Co., 1974, pp. 220–221.
High Fidelity, vol. 36, No. 2, Feb. 1986, Test Reports: JVC HR-D566U HQ VHS Hi-Fi VCR, pp. 23–30.

Primary Examiner—Raymond F. Cardillo
Assistant Examiner—David L. Robertson
Attorney, Agent, or Firm—Cushman, Darby & Cushman

[57] ABSTRACT

A tracking indication system of a VCR to make a recognition to a user whether or not a precise tracking of a video head is achieved. The invention includes a peak value detecting and holding circuit for detecting and holding in a predetermined time a peak value of the reproduction output signals, a level shift circuit for lowering an output of said peak value detecting and holding circuit to a predetermined level, a LPF for filtering the reproduction output signal, a differential amplifier whose a non-inverting terminal is connected to an output of said level shift circuit and an inverting terminal is connected to an output of said LPF to amplify a difference voltage between output signals of said level shift circuit and said LPF, and a LED which is activated or deactivated by a transistor being closed or open in response to an output signal of said differential amplifier.

1 Claim, 2 Drawing Sheets

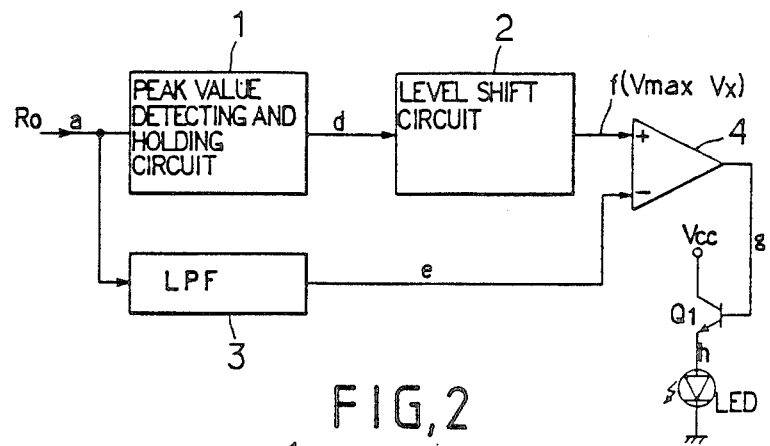
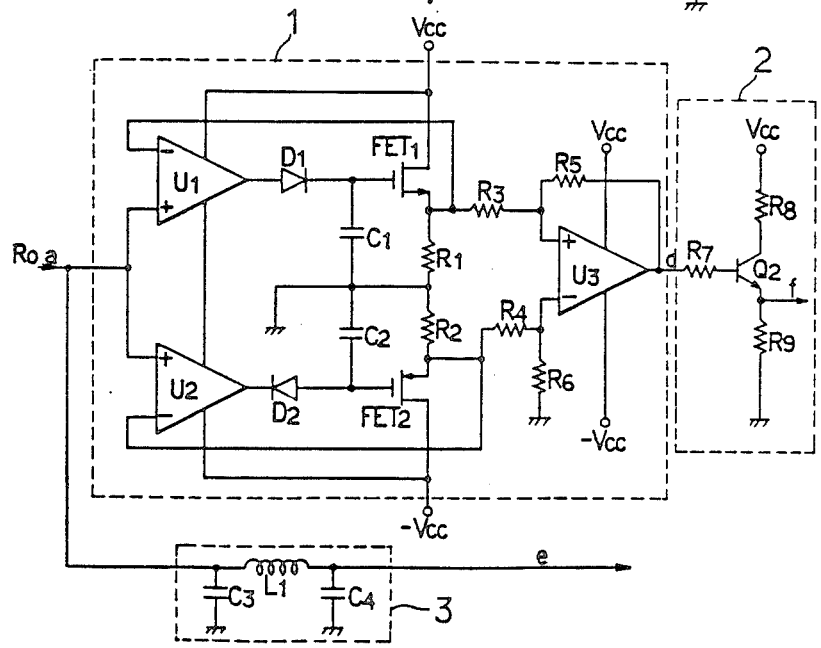

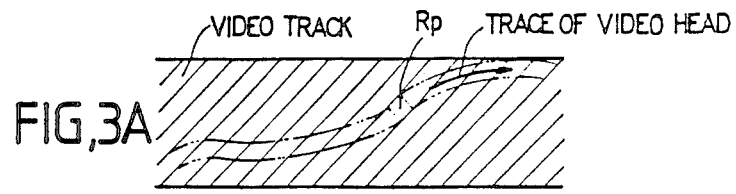
FIG.3A
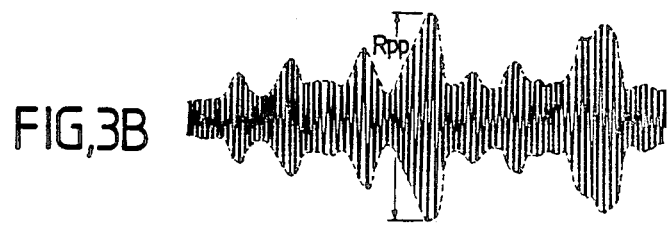
FIG.3B
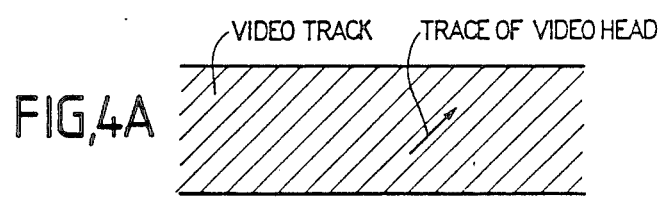
FIG.4A
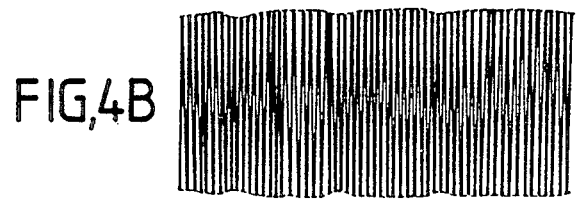
FIG.4B
FIG.5
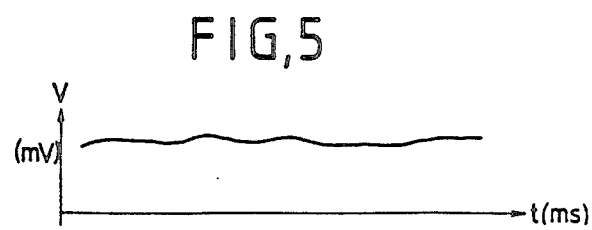

SYSTEM FOR INDICATING A PRECISE TRACKING IN A VIDEO CASSETTE RECORDER

FIELD OF THE INVENTION

The invention is broadly concerned with and intended particularly for a positive tracking indication circuit of a video cassette recorder (hereinafter, referred to as VCR) for indicating whether or not a video head of a VCR holds a positive tracking state.

DESCRIPTION OF THE PRIOR ART

There are many inherent deviations in a VCR such as a dimensional deviation of a video head and a deviation of the X-distance (the distance between a control head and a head drum). These deviations are compensated by adjusting a tracking knob, as being difficult to be perfectly adjusted in production. In practice, the compensation is effected by controlling the proceeding velocity of a tape or by bringing the practical X-distance to a predetermined distance.

However, such methods must be concomitant with readjustments in the replacement of a cassette with another one and must be effected while monitoring the screen state so that it is most difficult to adjust it to an optimum state. Furthermore, there is a drawback to throw a user into confusion when the poor condition of the tracking state is accompanied with any other troubles.

BRIEF SUMMARY OF THE INVENTION

It is therefore on object of this invention to provide a positive tracking indication system of a VCR for directly indicating the tracking state without disassembling a VCR set or using any other devices for a tracking adjustment.

A further object of the invention is the provision of a positive tracking indication system of a VCR by maintaining a lighting state of a light emitting diode (LED) to make a recognition to a user the necessity of the tracking adjustment when the tracking is not perfectly adjusted, and by deactivating the LED to make a recognition to a user the unnecessity of further tracking adjustment when the tracking is perfectly adjusted.

The tracking indication system described herein according to the present invention utilizes a peak value detecting and holding circuit for detecting and holding a peak value of reproduction output signals, a level shift circuit for lowering the reproduction output signal to a predetermined level, a low pass filter (LPF) for filtering the reproduction output signals, a differential amplifier whose a non-inverting terminal is connected to an output of the level shift circuit and an inverting terminal is connected to an output of the low pass filter to produce a low or high level signal according to the tracking state, and a light emitting diode which is activated or deactivated by a transistor being closed or open in response to the output signal of the differential amplifier.

BRIEF DESCRIPTION OF THE DRAWINGS

The above and further objects and novel features of the invention will more fully appear from the following description when the same is read in connection with the accompanying drawings. It is to be expressly understood, however, that the drawings are for purpose of illustration only and is not intended as a definition of the limits of the invention.

In the drawings:

FIG. 1 is a block diagram of a tracking indication system made pursuant to the instant invention;

FIG. 2 is a detailed circuit diagram of the system shown in FIG. 1;

FIGS. 3(A) and (B) illustrate a trace of a video head when a servo system and a travelling system is in unstable in tape loading state or in the beginning of travelling, and a waveform chart of the reproduction output signals hereupon, respectively;

FIGS. 4(A) and (B) illustrate a trace of the video heads when each video head is exactly traced on predetermined tracks with the servo system and the travelling system being in stable, and a waveform chart of the reproduction output signals hereupon, respectively; and, FIG. 5 is a waveform chart showing an output signal of a low pass filter shown in FIG. 1.

BEST MODE OF CARRYING OUT THE INVENTION

As illustrated in FIG. 1 showing a block diagram of a tracking indication system according to the present invention, the present invention comprises a peak value detecting and holding circuit 1 for detecting a peak-to-peak value of the reprocution output signals $R_0$ and holding the value during a predetermined time, a level shift circuit 2 for lowering the output signals of the peak value detecting and holding circuit 1 to a predetermined level, a low pass filter 3 for filtering the reproduction output signals $R_0$ and passing low level signals only therethrough, a differential amplifier 4 for amplifying the difference voltage between output signals of the level shift circuit 2 and of the low pass filter 3, and a light emitting diode (LED) which is activated or deactivated by a transistor $Q_1$ being closed or open in response to the output signal from the differential amplifier.

Referring to FIG. 2, there is shown a detailed circuit diagram of the system shown in FIG. 1, in which an exemplary embodiment of the invention is disclosed. The peak value detecting and holding circuit 1 comprises operational amplifiers $U_1$, $U_2$, and $U_3$, diodes $D_1$ and $D_2$, capacitors $C_1$ and $C_2$, field effect transistors $FET_1$ and $FET_2$, and resistors $R_1$–$R_6$. The level shift circuit 2 comprises resistors $R_7$–$R_9$ and a transistor $Q_2$ and the low pass filter 3 includes a high frequency removing capacitor $C_3$, a high frequency interrupting coil $L_1$, and a smoothing capacitor $C_4$.

The reproduction output signal $R_0$ from a video head is applied to the positive terminals of the operational amplifiers $U_1$ and $U_2$ of the peak value detecting and holding circuit 1 to provide an output proportional to the reproduction output signal $R_0$. A high level signal produced from the operational amplifier $U_1$ charges a capacitor $C_1$ through a diode $D_1$. The potential charged on the capacitor $C_1$ is maintained for a predetermined time since the input resistance of the $FET_1$ is large and the current is interrupted by the diode $D_1$. However, the potential is discharged inversely proportional to the time constant of the capacitor $C_1$ and the resistor $R_1$ by current loss, and the maintenance time of the potential charged on the capacitor $C_1$ is dependent upon the time constant of the capacitor $C_1$ and the resistor $R_1$. According to the change of the potential charged on the capacitor $C_1$, the potential produced from a source terminal of the $FET_1$ is changed to be applied to resistor $R_1$ whose voltage is applied to the negative terminal of the operational amplifier $U_1$ and is applied to the positive terminal of the operational amplifier $U_3$ through the resistor $R_3$. The voltage applied to the positive terminal of the operational amplifier $U_3$ depends on the positive peak voltage of the reproduction output signal $R_0$.

In the meantime, the negative peak voltage of the reproduction output signal $R_0$ may be detected and held by means of an operational amplifier $U_2$, a diode $D_2$, a capacitor $C_2$ and a $FET_2$ in a similar manner as described heretofore, and may be applied to the negative terminal of the operational amplifier $U_3$ through a resistor $R_4$. Accordingly, there is provided an output voltage, the sum of the detected positive peak voltage and negative peak voltage of the reproduction output signal $R_0$, at the output terminal of the operational amplifier $U_3$ which is the output of the peak value detecting and holding circuit 1. The sum output voltage provided at the output terminal of the operational amplifier $U_3$ is applied to the base of a transistor $Q_2$ through a resistor $R_7$ of the level shift circuit 2, thereby providing its emitter with the voltage proportional thereto. Because the maximum voltage $V_{max}$ at the output d of the peak value detecting and holding circuit 1 is lowered by a predermined voltage Vx through the level shift circuit 2, the signal at the output f of the level shift circuit 2 is not affected by instantaneous current variance and is applied to the positive terminal of the differential amplifier 4.

Further, the reproduction output signal $R_0$ is applied to the low pass filter 3 which removes high-requency waves at the high frequency removing capacitor $C_3$, which interrupts high-frequency wave at the high frequency interrupting coil L, and which smoothes the signal through the smothing capacitor $C_4$. The signal at the output e of the low pass filter 3 is substantially maintained in a predetermined level as illustrated in FIG. 5 and is applied to the negative terminal of the differential amplifier 3.

FIG. 3 illustrates that in case the servo system and the traveling system is in unstable in tape loading state or in the beginning of traveling as shown in FIG. 3(A), the peak value $R_{pp}$ of the reproduction output signal $R_0$ is raised as shown in FIG. 3(B) to result in raise of the voltage applied to the positive terminal of the differential amplifier 4.

However, in case that the servo system and the traveling system is stablized and that the video head is traced in coincidence with the video track as shown in FIG. 4(A), the reproduction output signal $R_0$ is maintained at a predetermined level as shown in FIG. 4(B), in which the level of the reproduction output signal $R_0$ is lowered as compared with the peak value $R_{pp}$ shown in FIG. 3(B). Therefore, after the lapse of holding time of the peak value detecting and holding circuit 1 as described hereinbefore, the voltage according to the normal reproduction output signal $R_0$ is applied to the positive terminal of the differential amplifier 4.

By making the voltage applied to the negative input terminal of the differential amplifier 4 larger than that applied to the positive input terminal thereof when the video head exactly coincides with the video track, and by making the voltage applied to the positive input terminal larger than that applied to the negative terminal when the video head is not in coincidence with the video trak, there may be provided a low level signal at the output of the differential amplifier 4 in normal tracking state and a high level signal in abnormal state. Accordingly, when the signal at the output g of the differential amplifier 4 is in high level, the transistor $Q_1$ is rendered effective and the light emitting diode (LED) is activated to make a recognition to a user abnormal tracking state, when the signal at the output g of the differential amplifier 4 is in low level, the transistor $Q_1$ is rendered ineffective and the LED is deactivated to make a recognition to a user normal tracking state.

As described heretofore, with the LED being activated in abnormal tracking state and being deactivated in normal tracking state to indicate a precise tracking of the video head, a user can effect a precise tracking adjustment without using a special measuring device or disassembling the VCR set and a workman in a factory site can readily effect a tracking adjustment.

As many apparently widely different embodiments of this invention may be made without departing from the spirit and scope thereof, it is to be understood that the invention is not limited to the specific embodiments thereof except as defined in the appended claims.

I claim:

1. A tracking indication system of a video cassette recorder comprising:

a peak value detecting and holding circuit for detecting and holding in a predetermined time a peak-to-peak value of a reproduction output signal;

a level shift circuit which is connected to an output of said peak value detecting and holding circuit and lowers an output of said peak value detecting and holding circuit to a predetermined level;

a low pass filter for passing only a low level signal among said reproduction output signal;

a differential amplifier for amplifying a difference voltage between outputs of said level shift circuit and said low pass filter, a non-inverting terminal being connected to the output of said level shift circuit and an inverting terminal being connected to the output of said low pass filter;

a transistor being rendered effective or ineffective in response to a high-level or low-level signal from said differential amplifier; and a light-emitting diode being activated or deactivated according to said transistor being closed or open.

* * * * *